United States Patent [19]

Heck

[11] Patent Number: 5,147,554
[45] Date of Patent: Sep. 15, 1992

[54] PROCESS FOR TREATING WASTES FROM THE MACHINING OF FERROMAGNETIC MATERIALS

[75] Inventor: Alfred Heck, Eupen, Belgium

[73] Assignee: Filterwerk Mann & Hummel GmbH, Ludwigsburg, Fed. Rep. of Germany

[21] Appl. No.: 720,379

[22] Filed: Jun. 25, 1991

[30] Foreign Application Priority Data

Jun. 26, 1990 [DE] Fed. Rep. of Germany ....... 4020229

[51] Int. Cl.$^5$ ............................................. B01D 35/06
[52] U.S. Cl. ..................... 210/695; 210/748; 210/749; 210/771; 210/772; 210/791; 210/805; 209/3; 209/214; 134/1; 134/10; 134/34; 134/40
[58] Field of Search ....................... 210/101, 195.1, 196, 210/222, 223, 695, 748, 749, 771, 772, 791, 805; 209/3, 10, 214, 223.1, 224, 232; 134/1, 10, 25.1, 34, 40

[56] References Cited

U.S. PATENT DOCUMENTS

| | | | |
|---|---|---|---|
| 1,580,723 | 4/1926 | Hapgood | 134/25.1 |
| 2,398,725 | 4/1946 | Schutte | 209/232 |
| 2,428,228 | 9/1947 | Keck | 209/214 |
| 3,360,869 | 1/1968 | Müller | 210/771 |
| 3,734,776 | 5/1973 | Keogh, Jr. | 134/40 |
| 3,757,948 | 9/1973 | Tikhonov et al. | 222/223 |
| 3,846,173 | 11/1974 | Ihrig | 134/10 |
| 3,997,359 | 12/1976 | Dankoff et al. | 134/10 |
| 4,018,886 | 4/1977 | Giaever | 210/222 |
| 4,054,513 | 10/1977 | Windle | 209/214 |
| 4,314,856 | 2/1982 | Steimel | 134/25.4 |
| 4,851,119 | 7/1989 | Bergloeff et al. | 210/400 |

FOREIGN PATENT DOCUMENTS

| | | |
|---|---|---|
| 888718 | 11/1981 | Belgium . |
| 116468 | 8/1984 | European Pat. Off. . |
| 3725528 | 3/1988 | Fed. Rep. of Germany . |
| 3739496 | 6/1989 | Fed. Rep. of Germany . |
| 2209859 | 7/1974 | France . |
| 2286676 | 4/1976 | France . |
| WO79/00244 | 5/1979 | PCT Int'l Appl. . |
| 2038667 | 7/1980 | United Kingdom ................ 210/695 |
| 2219526 | 12/1989 | United Kingdom . |

Primary Examiner—Robert A. Dawson
Assistant Examiner—Matthew O. Savage
Attorney, Agent, or Firm—Foley & Lardner

[57] ABSTRACT

A process and apparatus for treating waste which contains ferromagnetic components, such as the grinding sludge from grinding ferromagnetic materials which contains ferromagnetic particles contaminated with water and oil, in which the waste is introduced into a separating tank containing a washing solution and mixed with the solution by stirring until the oil dissolves. Subsequently, a magnetic field is produced at the separating tank wall which causes magnetic components to accumulate on the wall. The wash solution is then filtered to remove non-ferromagnetic solids. The magnetic field is subsequently removed, and accumulated ferromagnetic components are released into the wash solution. The ferromagnetic components are then filtered out from the wash solution and dried, and the filtered wash solution is conveyed to an oil separation tank where oil separated from the waste is recovered.

13 Claims, 9 Drawing Sheets

PROCESS FOR TREATING WASTES FROM THE MACHINING OF FERROMAGNETIC MATERIALS

BACKGROUND OF THE INVENTION

The invention relates to a process for treating wastes from the machining of ferromagnetic materials, and to an apparatus for carrying out such a process.

German Published Patent Application No. DE 37 39 496 discloses a band filter system for purifying a contaminated liquid, especially machining coolant which is used in the cutting of metals. A band filter system of this kind is provided with a dirt chamber to which the coolant is fed. Underneath this dirt chamber is a filter support on which a non-woven filter is situated. The non-woven filter is progressively moved automatically in steps according to the amount of waste deposited on it. The wastes are removed from the system by the non-woven filter and passed into an accumulator. This waste contains, in addition to a great amount of metal chips and metal dust, grinding residues, such as corundum, for example. Moreover these wastes are still heavily loaded with oil and with emulsion.

The disposal of this mixture without further treatment can be performed only by licensed waste disposal companies, and only at special dumps. Attempts have, of course, been made to feed this mixture into an incinerator. Because of the metal and corundum components, however, this is an uneconomical solution. Due to the high content of foreign substances, it is also impractical to melt down the metals in a smelting furnace.

German Published Patent Application No. DE 37 25 528 discloses an apparatus for compressing and removing water from suspensions, sludges or the like. It has been found, however, that it is impossible to remove the oil adhering to such residues, even under high pressures.

SUMMARY OF THE INVENTION

It is therefore the object of the invention to provide a process and apparatus for effectively treating particulate wastes containing ferromagnetic components.

Another object of the invention is to provide a process and apparatus which enables ferromagnetic components of particulate waste materials to be separated from non-ferromagnetic components thereof.

A further object of the invention is to provide a process and apparatus for treating waste materials containing ferromagnetic components which facilitates recycling of the ferromagnetic material.

These and other objects of the invention are achieved by providing a process for treating wastes from machining of ferromagnetic materials comprising feeding the wastes to a separating tank having at least one vertical wall, filled with a wash solution, and mixing the wastes with the wash solution, producing a magnetic field on the at least one vertical tank wall, and accumulating ferromagnetic components on the at least one wall, filtering out non-ferromagnetic solids from the wash solution, removing the magnetic field and releasing ferromagnetic components from the at least one wall into the wash solution; and filtering out released ferromagnetic components from the wash solution.

According to a further aspect of the invention, the objects are achieved by providing an apparatus for treating wastes from the machining of ferromagnetic materials comprising a hopper for collecting the wastes, a separating tank filled with a wash solution for receiving wastes, the tank having at least one wall surface, a metering device for removing a controlled amount of the wastes from the hopper and introducing the wastes into the separating tank, and means for selectively producing a magnetic field at the wall surface such that ferromagnetic components of the waste separate from non-ferromagnetic components of the waste and accumulate on the wall surface.

According to a preferred aspect of the invention the apparatus further comprises first and second filter systems, conduit means leading from the separating tank to the first and second filter systems, a pump for conveying wash solution from the separating tank through the conduit means, and valve means for selectively directing wash solution from the conduit means to the first filter system or to the second filter system.

An important advantage of the described process is the removal of the oil and of the emulsion adhering to the metal or abrasive particles. Since the wastes are moving in a wash solution, such dissolution is accomplished by the interaction of oil-soluble substances and the continuous movement of the contents of the tank.

Since grinding residues are primarily produced in the machining of steel and cast steel parts such as crankshafts, camshafts, cylinder heads and cylinder sleeves, these metal grinding wastes can be separated from other solid residues by a magnetic separation method.

After the oil adhering to the particles is removed, the ferromagnetic components are caused to accumulate on the tank wall by a magnetic field which is produced at the wall. Thus the wash solution, with the other components which are now still contained in it, such as corundum for example, can be circulated through a filter system in order to filter these non-ferromagnetic components out of the solution.

In a second filtration phase the ferromagnetic components are released back into the wash solution by shutting off the magnetic field, and are fed to a second filter system to remove these components. After the wash solution has been entirely freed of particles it is fed to a wash water treatment vessel. The separating tank is again filled with treated wash solution and waste can again be introduced into the wash solution, i.e., into the separating tank.

In addition to the stirring movement in the tank, the wash solution and the components contained therein can be circulated. Such circulation assures that the solid particles will not settle in the tank.

Over time, oil will concentrate in the wash solution, and after a certain period of time the solution can be replaced. However, it is also possible (and provision is made for it in one embodiment of the invention) to feed this solution to a tank in which the oil contained in the wash solution is separated.

According to a further development of the invention, the filter systems may be provided with drying systems. These drying systems may be, for example, compressed-air dryers which remove moisture from the filtrate and have become known as compressed-air sludge treatment filters. After the filtrate has been dried and removed from the compressed-air sludge treatment filter, the filter can be flushed with the wash solution.

In another preferred embodiment of the invention, baffle plates are disposed in the separating tank and serve to:

a) remove dirt-laden wash liquid from the magnetic field so that only the ferromagnetic components are attracted by the magnets as they pass by the magnets, b) prevent stirring up of the ferromagnetic particles which have been deposited on the tank wall by the magnetic field, and c) prevent premature wear on the inside wall of the tank.

The apparatus of the invention thus is equipped with a separating tank which not only assures good agitation and hence a good removal of the oil adhering to the solid particles, but also has areas which permit little or no flow of the liquid and in which a magnetic field is exerted.

In one embodiment of the invention only a single circulation pump is needed for the agitation of the wash solution, the filtering out of the ferromagnetic components and the filtering out of the non-ferromagnetic solid components. The various branches of the conduits that run to the tank and to the filter systems are controlled by valves, preferably remotely controlled magnetic valves. For this purpose a control system is needed, containing a timer for example, so that the agitation of the wash liquid, the filtering out of the individual components, the drying, the metering, and the flushing of the filters will be performed according to a specified time schedule.

The separating tank may simply be a hollow cylindrical tank provided at its bottom with a funnel-like outlet. On the outer wall of the hollow cylindrical body, permanent magnets or electromagnets are disposed, by means of which a magnetic field can be produced inside the separating tank. The electromagnets are turned on and off directly by the control system, whereas permanent magnets are actuated also by the control system by moving them toward or away from the tank wall, e.g., by means of an adjustable drive. In an advantageous embodiment, the magnets may be fine-pole or coarse-pole magnets, so that the deposit of ferromagnetic particles on the inside wall of the tank will conform to the shape of the tank wall. Instead of a cylindrical tank, the separating tank in an alternative embodiment may have a tank wall composed of a plurality of flat surfaces in the form of a regular polygon.

Appropriate washing solutions include, for example, solutions containing a surfactant that produces an emulsion of the oil in water. A suitable wash solution for the process of the invention may be, for example, a partially stable emulsion which emulsifies upon agitation and thus removes the oil from the particles in the agitated washing phase, and which in a quiet phase separates into detergent substances and oil, so that the oil can be processed with a centrifuge, for example, for reuse.

BRIEF DESCRIPTION OF THE DRAWINGS

The invention will be explained in further detail below with reference to illustrative preferred embodiments depicted in the accompanying drawings in which.

DETAILED DESCRIPTION OF PREFERRED EMBODIMENTS

Figure 1:
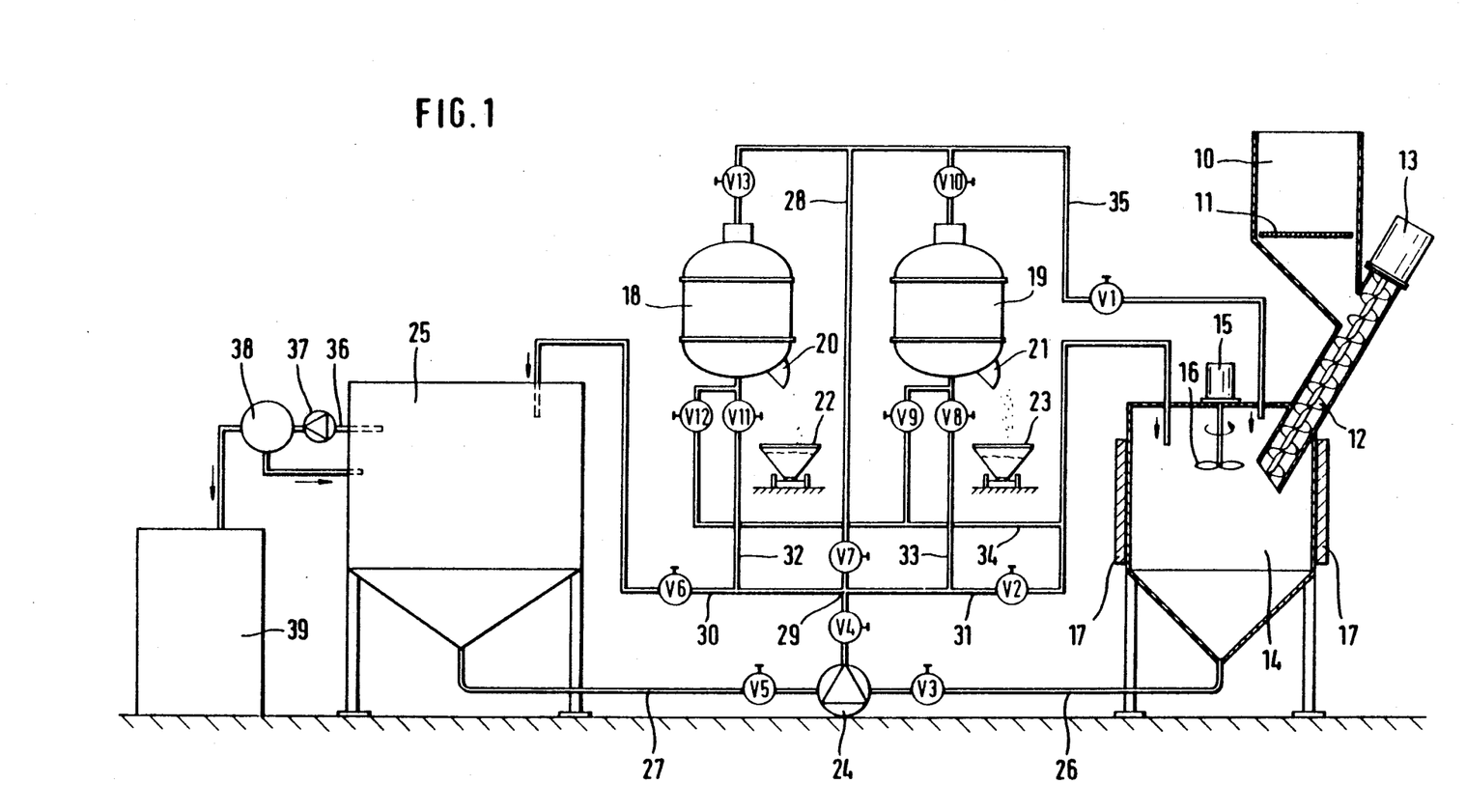
FIG. 1 shows the construction of an apparatus for carrying out the treatment process of the invention.

The apparatus shown in FIG. 1 for the treatment of wastes from the machining of ferromagnetic materials comprises a hopper 10 which has an input opening at the top and is equipped with a shaker sieve 11. The shaker sieve serves to remove pieces which might erroneously have fallen into the wastes. Underneath the hopper 10 is a metering device in the form of a screw feeder 12. This screw feeder 12 feeds the wastes directly into a tank 14. This tank comprises a cylindrical upper part and a funnel-like outlet at the bottom. A stirrer 15 is disposed in the tank which stirs the tank contents with its vane wheel 16. A plurality of radially movable, permanent magnets 17 are disposed outside the cylindrical outer wall of the tank which can be moved toward or away from the tank wall.

Furthermore, two compressed-air sludge treatment filters 18 and 19 are provided. Such filters are commercially available and are described, for example, in brochures VKD 5028 of the firm of Mann & Hummel GmbH and 7-87 1.5M of the firm of Hydromation Belgien. These compressed-air sludge treatment filters 18 and 19 consist of a filter surface on which the sludge contained in the incoming liquid is deposited. This sludge is then dried in these filters, i.e., by blowing compressed air on the sludge, and after the residual moisture content has decreased to a low level, the sludge is conveyed by discharge devices 20 and 21 to respective transport containers 22 and 23.

As it can be seen from the drawing, all of the components are connected together by pipes or conduits. Valves V1 through V13 are arranged on the conduits. These valves serve to connect various conduits or to open and close the appropriate conduits pipelines for the various process steps.

A single circulation pump 24 is provided for circulating the liquid contained in the entire system.

A tank 25 is also provided for treating the liquid contained in the system. The regeneration phase and the apparatus needed for that purpose are described further below. Tank 25 simultaneously serves as a reservoir for the liquid which constitutes the wash solution and which is capable of releasing and binding the oil adhering to wastes from grinding operations.

The separating tank 14 is connected by a conduit 26 to the pump 24. A conduit 27 leads from the pump to the oil separation tank 25. In these two conduits are valves V3 and V5. A conduit 28 runs from pump 24 to the compressed-air sludge treatment filters 18 and 19. In this conduit are the valves V4, V7, V10, and V13. Conduit 28 also is connected at the intersection 29 to conduits 30 and 31. Conduit 31 runs through the valve V2 to an inlet at the top of separating tank 14. Conduit 30 runs through valve V6 to an inlet at the top of tank 25. A conduit 32 runs from the outlet of filter 18 through a valve V11 to conduit 30. Also, a conduit 33 leads from the outlet of filter 19 through a valve V8 to conduit 31. Furthermore, the outlets of the two filters 18 and 19 are connected by a conduit 34 and valves V9 and V12 to conduit 31 which leads to the inlet at the top of the separating tank 14. Conduit 28 is connected by a conduit 35 and a valve V1 to an additional inlet at the top of separating tank 14. Tank 25 has an outlet line 36 on which there is a pump 37. A device which is suitable for the treatment of oil, such as a centrifuge 38, for example, is connected to the discharge of pump 37. The treated oil passes from centrifuge 38 into an oil receiving tank 39.

Figure 2:
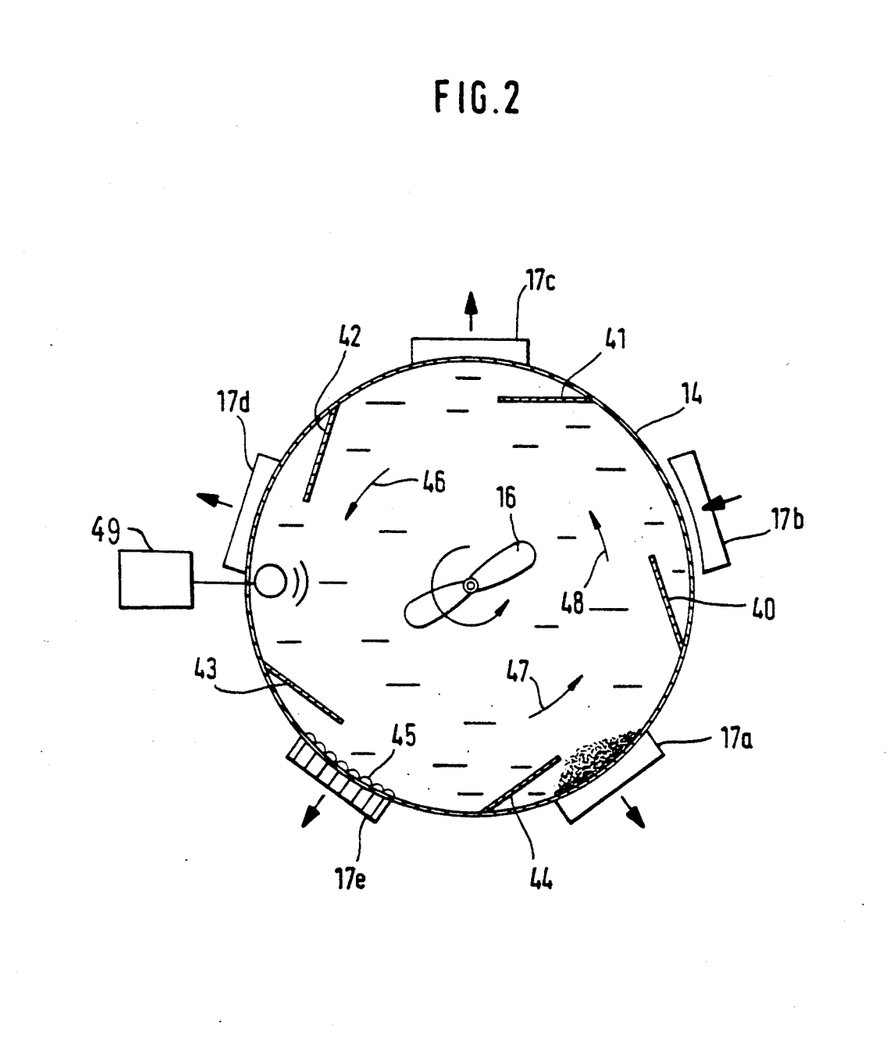
FIG. 2 is a top view of the separating tank depicted in FIG. 1.

FIG. 2 shows a top view of the separating tank 14. An impeller 16 is provided in the separating tank 14 in order to assure thorough mixing of the components contained in the tank. Optionally, mixing of the wastes and the wash solution may also be effected by applying ultrasonic energy to the waste-containing wash solution by ultrasonic energy applying means 49. Deflecting plates 40, 41, 42, 43 and 44 are provided inside the tank, adjacent its cylindrical outer wall. The deflecting plates each are situated upstream of the permanent magnets 17a to 17e disposed on the outer wall of the separating tank 14. As shown by permanent magnet 17e, each magnet 17a-e consists of several individual smaller magnets, and the direction of magnetization is substantially radial. Since the tank wall material is nonmagnetic, the field produced by the magnets acts within the interior of the tank. The lines of force 45 will form substantially in accordance with the drawing. Each of the magnets 17a to 17e can be moved away from the tank wall. To represent this, the magnet 17b is shown moved away from the tank wall. The distance of the magnet from the tank wall is such that an effective magnetic field is no longer exerted in the interior of the tank.

The operation of the magnets and of the deflecting plates will be explained further in the following description of how the process of the invention is carried out.

FIGS. 3 through 9 each again show the entire apparatus. The individual steps of the process are represented in these figures. In particular it can be seen from these figures which conduits are open for the circulation or agitation of the liquid. The open lines are provided with arrows to indicate the direction of flow.

Figure 3:
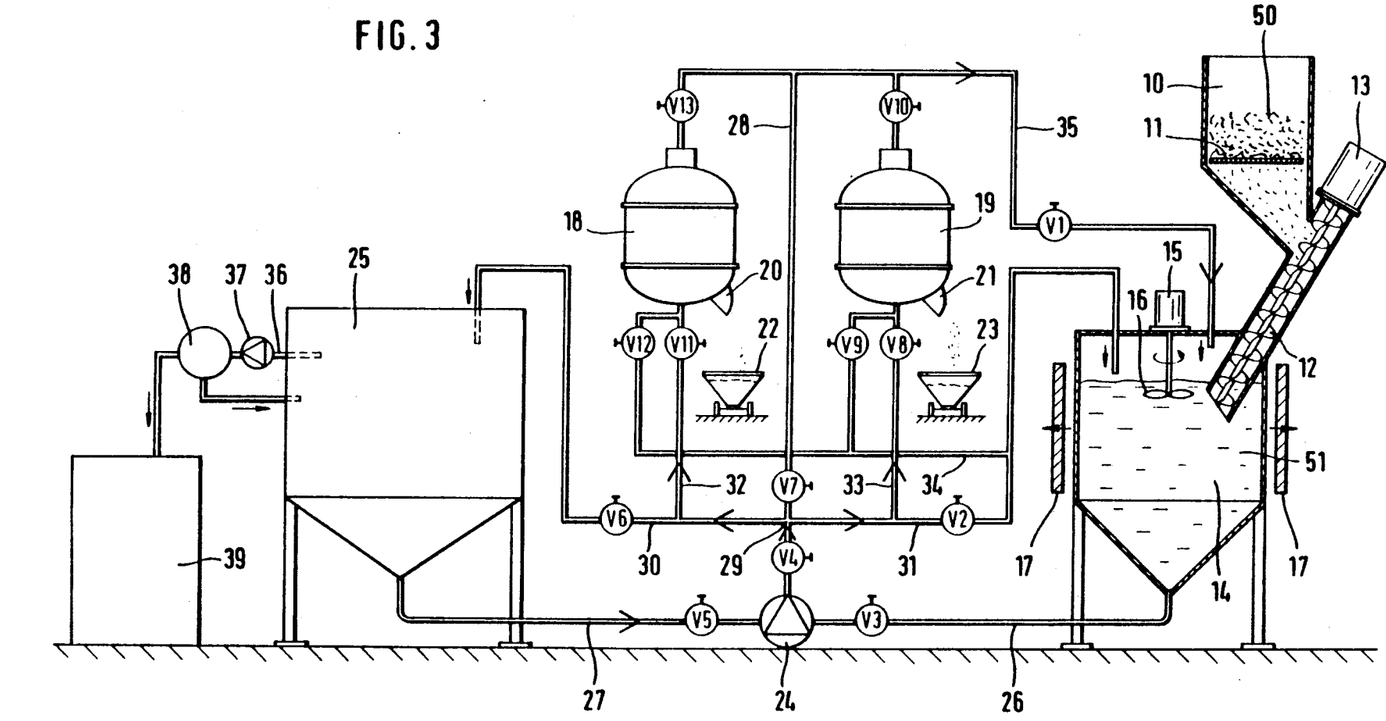
FIGS. 3 through 9 show the apparatus depicted in FIG. 1 during various stages of the process.

First it is assumed that hopper 10 contains wastes from the machining of ferromagnetic materials, i.e., abrasive residues contaminated with water and oil, as shown in FIG. 3. These wastes pass through the shaker sieve 11 to the screw feeder 12 and are metered into the tank 14. For example, an amount of 40 kg is fed into the tank, which has a capacity of about 400 liters.

Figure 4:
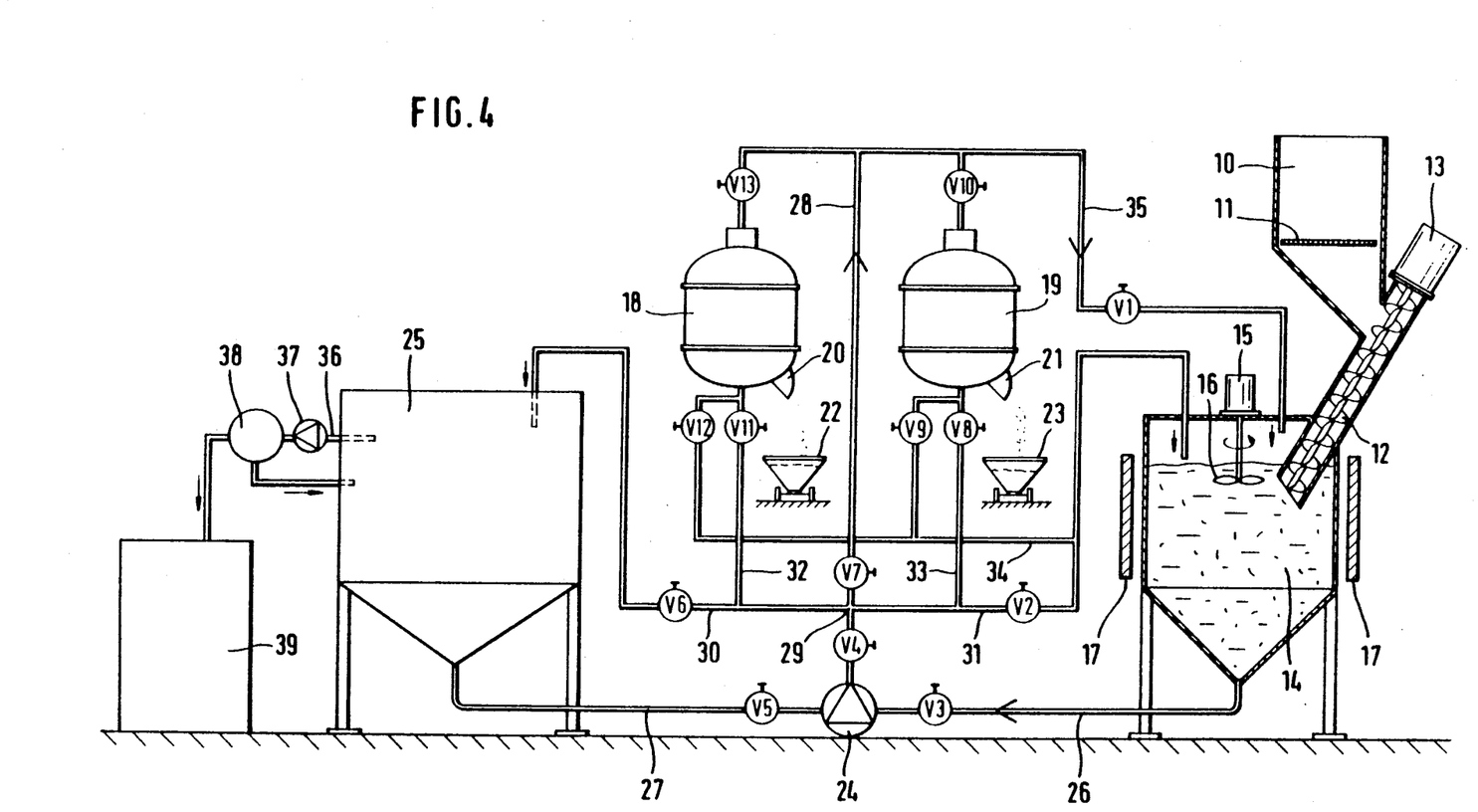

The tank is first filled with wash solution. This wash solution is in tank 25 whence it is fed through conduit 27 by the pump 24 through conduits 32 and 33 to the filters 18 and 19. The wash solution leaves these filters 18 and 19 through conduit 35, and flows through the valve V1 into the separating tank 14. This delivery of liquid produces a flushing and hence a cleaning of the filter surfaces disposed in the compressed-air sludge treatment filters. Furthermore, with valve V2 open and valves V8 and V11 closed, it is possible to bypass the treatment filters 18 and 19 through conduit 31. The separating tank 14 is thus filled with the wash solution. The screw feeder 12 does not deliver the prescribed amount of waste into the separating tank 14 until after a sufficient amount of wash solution is present in the separating tank. At the same time the stirrer 15 is started up, so that the wash solution is thoroughly mixed with the wastes This mixing phase is represented in FIG. 4.

In addition to mixing by means of the stirrer 15, a circulation of the tank contents is created by the fact that the pump 24 is in operation and circulation is produced through conduits 26, 28 and 35 with valves V3, V4, V7 and V1 opened accordingly. This mixing and circulation of the tank contents continues until the oil adhering to the wastes has been removed from these wastes.

Figure 5:
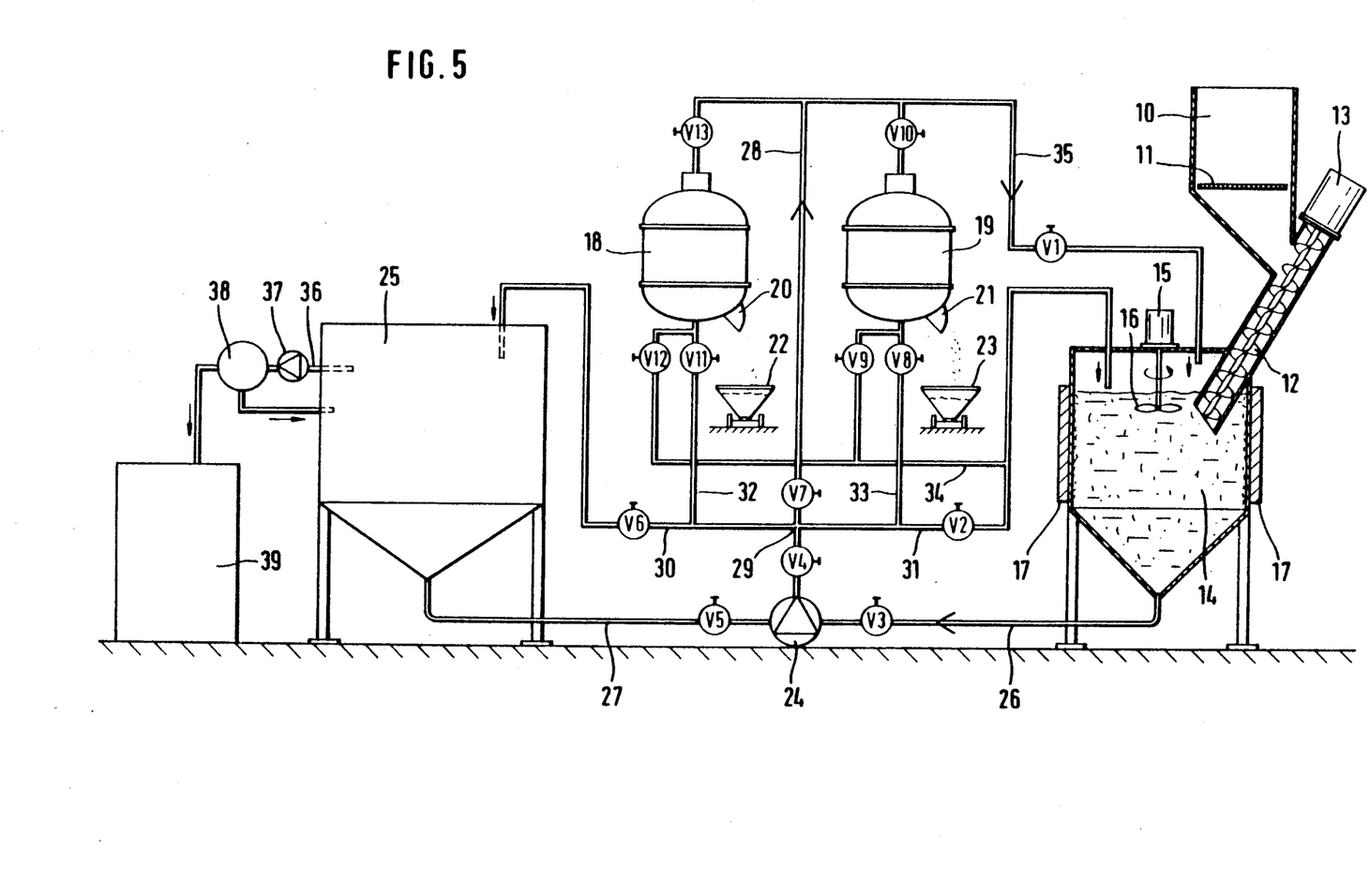

The next step in the process is represented in FIG. 5. During this process step both the movement of the wash solution by the stirrer 15 and its circulation through conduit 26, pump 24, conduits 28 and 35 is continued. During this phase, however, the permanent magnets 17a through 17e, which until then have been spaced a distance from the tank wall, are applied to the tank wall, so that a magnetic field is exerted in the tank.

In FIG. 2 the arrows 46, 47 and 48 indicate that a substantially circular flow is imparted to the liquid in the tank by the movement of the impeller 16. After the permanent magnets have been moved against the outer wall of the tank, the ferromagnetic particles contained in the liquid are deflected from the circular movement and deposit themselves in the area of the magnetic field, as indicated at the magnet 17a. The deflecting plates 40 through 44 serve to quiet the flow in the area of the magnetic lines of force and create a quiescent space by appropriately arranging the deflecting plates to:

a) move the dirt-laden wash liquid away from the magnetic field so that only the ferromagnetic components flowing past the magnets are attracted by the magnets;

b) prevent the ferromagnetic components which have been deposited on the tank wall by the magnetic field from being stirred up; and c) prevent the tank inner wall from wearing out prematurely.

After the ferromagnetic components have settled on the inner wall of the tank in the area of the magnetic field of the permanent magnets, there remain in the wash water only the non-ferromagnetic components of the wastes, i.e., corundum for example, which usually comes loose from the abrasive in a grinding procedure.

Figure 6:
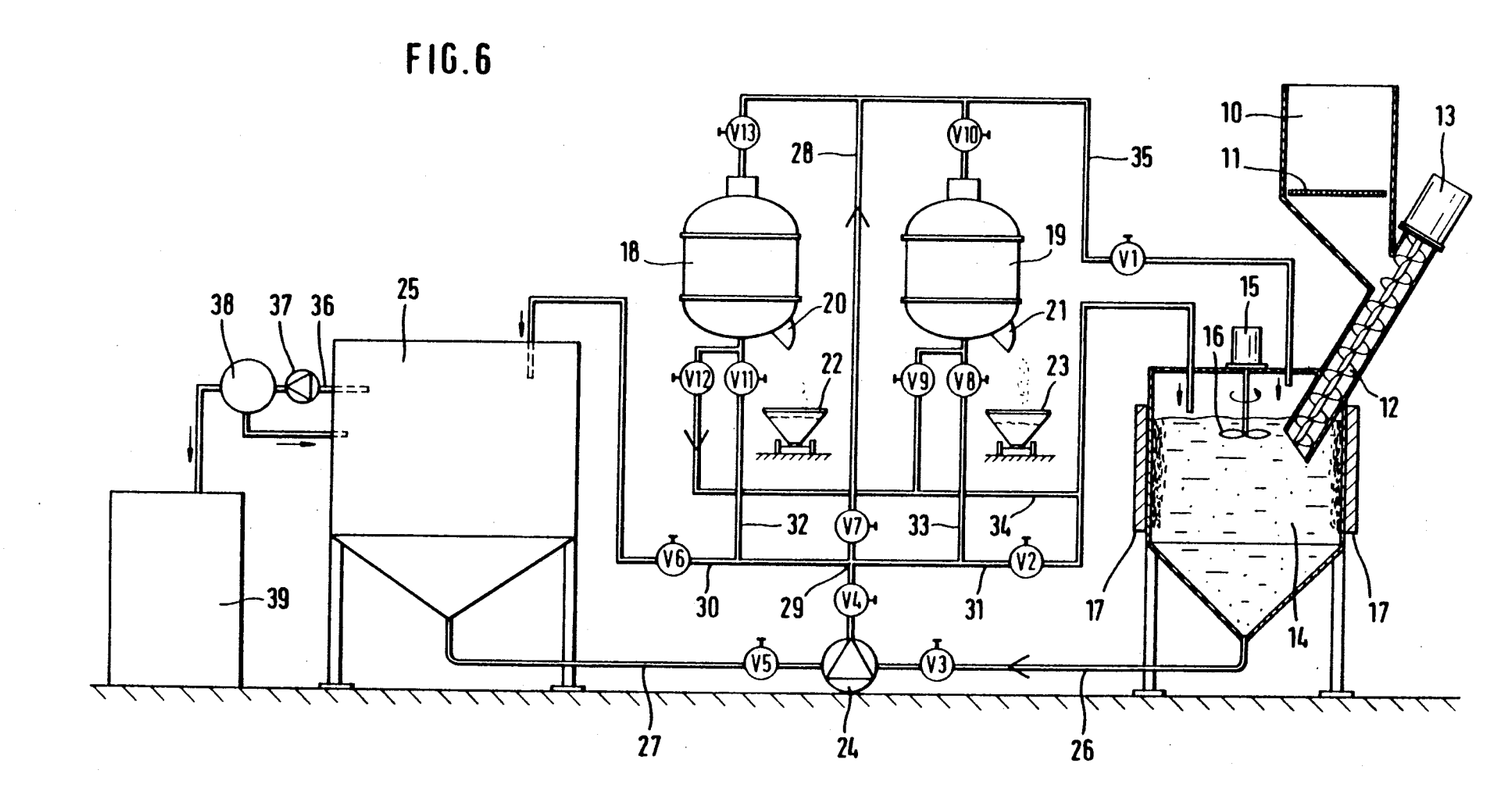

As soon as this phase of preliminary separation is ended, the components still contained in the liquid, i.e., the remainder of the grinding sludge, are filtered out from the wash solution, as shown in FIG. 6. For this purpose, while stirring by the stirrer 15 is continued, the liquid is fed through conduit 26 and pump 24 to conduit 28. The liquid passes through the conduit 28 and the valve 13, which is opened, into the compressed-air sludge treatment filter 18 and from there through conduit 34 back into the separating tank 14. This circulation is maintained until all of the liquid contained in the separating tank has been fed repeatedly through the filter 18, and the residues contained in the liquid have been completely removed. During this procedure, of course, the permanent magnets remain active so that the ferromagnetic particles remain collected on the walls of the separating tank 14.

Figure 7:
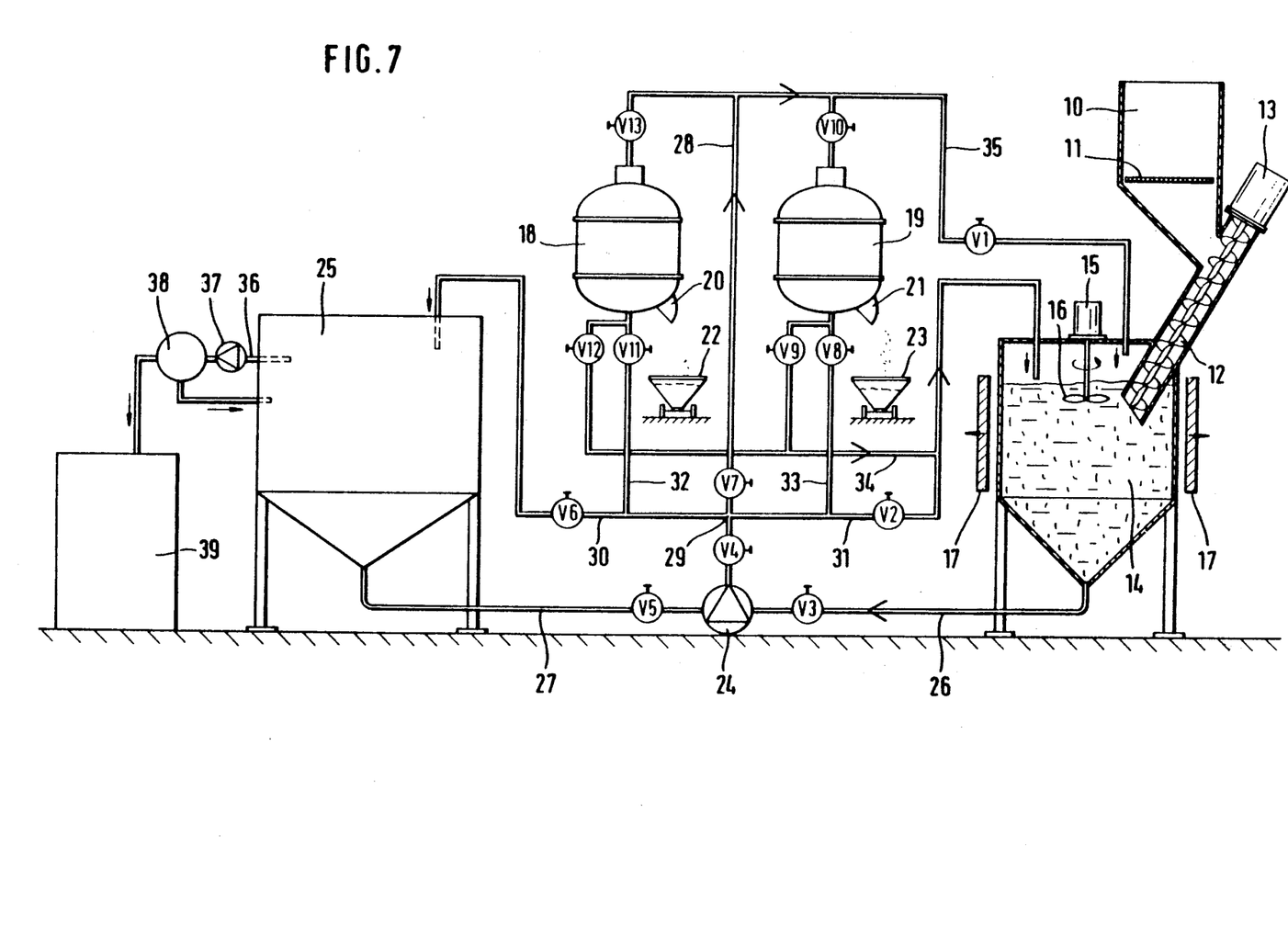

In the next process step according to FIG. 7, the permanent magnets 17a to 17e are moved outwardly away from the tank wall, i.e., the magnetic field in the separating tank is deactivated. The ferromagnetic components thus are released from the tank wall. The stirrer 15 is still running, so that these components are mixed back into the liquid. This liquid is then fed through conduit 26 by means of pump 24 and through conduit 28 to the compressed-air sludge treatment filter 19. The filtered liquid passes through valve V9 and conduit 34 back into the separating tank 14. During this phase the ferromagnetic particles are deposited in the filter 19. At the same time, the non-ferromagnetic solids which have been collected in the filter 18 are dried by the introduction of compressed air.

Alternatively, non-ferromagnetic solids are cleaned from filter system 18, and the same filter system 18 is subsequently used to filter out released ferromagnetic solids from said wash solution.

Figure 8:
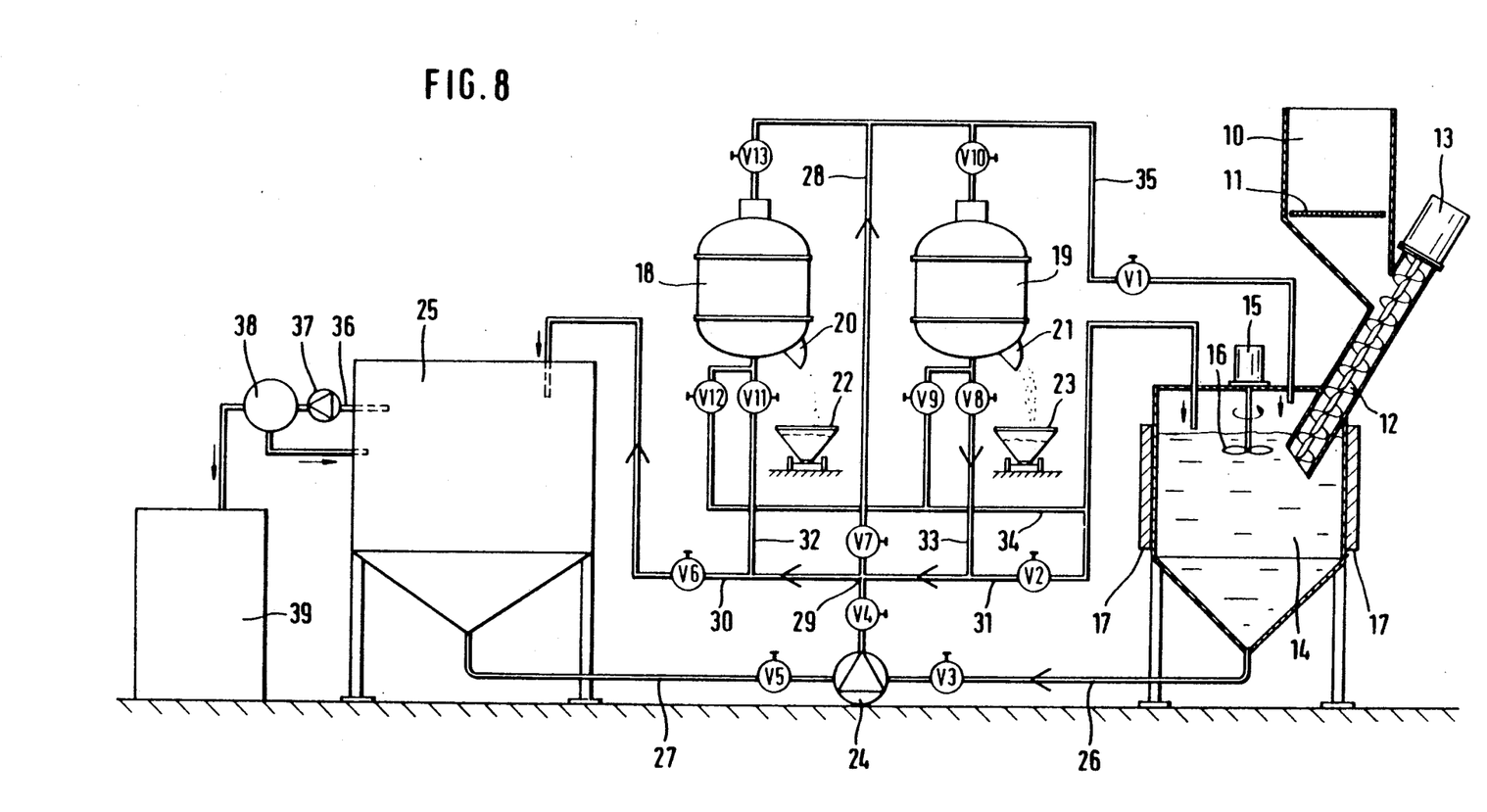

In the next process step according to FIG. 8, the separating tank 14 is emptied, i.e., the liquid passes through conduit 26, valve 3, pump 24, and valve 4, conduit 30, valve 6, into the oil separation tank 25.

Figure 9:
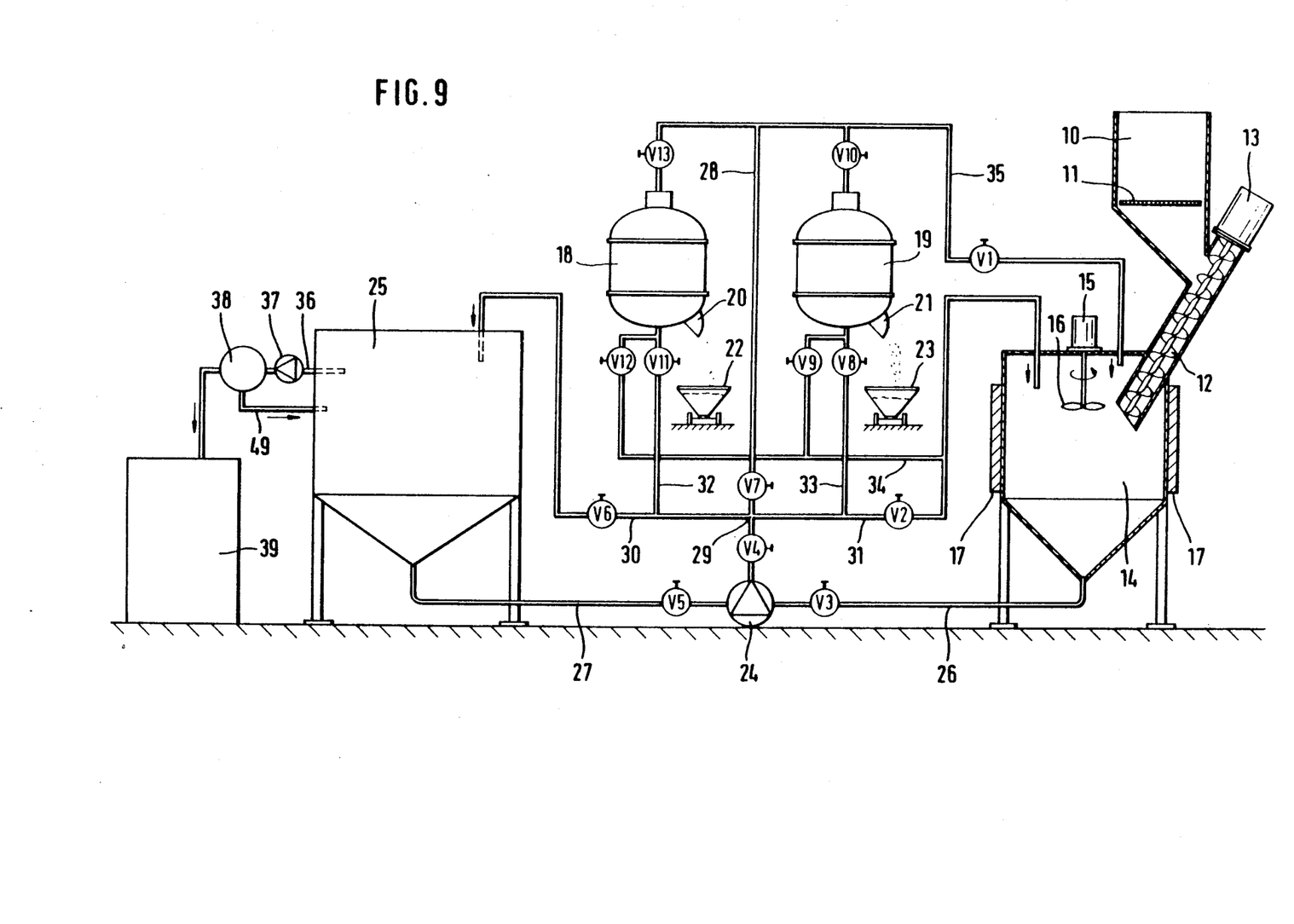

After the liquid has been completely removed from the separating tank 14, the residues contained in filter 19, i.e., the ferromagnetic components, are dried in a final step according to FIG. 9. Furthermore, the oil is separated from the wash water in tank 25. The separated oil is fed through the outlet 36 and pump 37 to the treatment apparatus or centrifuge 38. This centrifuge separates any residues of water and sludge still contained in the oil. The oil then passes into an oil receiver, and the water and sludge separated by the centrifuge are returned to the tank 25 through conduit 49.

After the drying procedures in filters 18 and 19 have ended, a gate is opened on the discharge devices 20 and 21. The dried and now separated wastes pass into transport containers 22 and 23. These wastes have a virtually dry consistency, and they contain little or no oil, so that they can be recycled or disposed of without difficulty.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

I claim:

1. A process for treating wastes from machining of ferromagnetic materials comprising:
   feeding said wastes to a separating tank having at least one vertical wall, filled with a wash solution, and mixing said wastes with said wash solution;
   producing a magnetic field on said at least one vertical tank wall, and accumulating ferromagnetic components on said at least one wall;
   thereafter, filtering out non-ferromagnetic solids from said wash solution;
   removing said magnetic field and releasing ferromagnetic components from said at least one wall into said wash solution from which non-ferromagnetic solids have been filtered; and
   then filtering out released ferromagnetic components from said wash solution.

2. A process according to claim 1, wherein said wastes are grinding wastes mixed with water and oil.

3. A process according to claim 1, wherein said wastes are fed to said tank through a metering apparatus.

4. A process according to claim 1, wherein non-ferromagnetic solids are cleaned from a filter system used to filter them out of said wash solution, and the same filter system is subsequently used to filter out released ferromagnetic solids from said wash solution.

5. A process according to claim 1, wherein said wash solution containing non-ferromagnetic solids is delivered to a first filter system to filter the non-ferromagnetic solids out of said wash solution, and said wash solution with released ferromagnetic components is delivered to a second filter system to filter out the ferromagnetic components from said wash solution.

6. A process according to claim 1, wherein mixing of said wastes with said wash solution is effected by stirring the waste-containing wash solution in said tank.

7. A process according to claim 1, wherein mixing of said wastes with said wash solution is effected by withdrawing the waste-containing wash solution from said tank and recirculating the withdrawn solution back to said tank.

8. A process according to claim 1, further comprising the step of feeding said wash solution from which ferromagnetic components have been filtered out to an oil separation tank, and separating accumulated oil from said wash solution.

9. A process according to claim 1, further comprising contacting ferromagnetic components filtered from said wash solution with an air current to dry them, and collecting the resulting separated and dried material in a receiver.

10. A process according to claim 1, further comprising removing said non-ferromagnetic solids or said ferromagnetic components from a filter system used to filter them out of said wash solution, and thereafter flushing said filter system by pumping filtered wash solution therethrough to clean said filter system.

11. A process according to claim 1, further comprising providing at least one quieting zone within said separating tank in the vicinity of said magnetic field where deflecting means quiet the flow of wash solution to create a quiescent condition, whereby:
   a) dirt-laden wash liquid is diverted from the magnetic field so that only the flowing ferromagnetic components are attracted by the magnets,
   b) stirring up of the ferromagnetic components which have accumulated on the tank wall due to the magnetic field is avoided, and
   c) premature wear on the inside wall of the tank is prevented.

12. A process according to claim 1, wherein mixing of said wastes and said wash solution is effected by applying ultrasonic energy to the waste-containing wash solution.

13. A process according to claim 1, further comprising contacting non-ferromagnetic solids filtered from said wash solution with an air current to dry them, and collecting the resulting separated and dried material in a receiver.

* * * * *